(12) United States Patent
Bijarbooneh et al.

(10) Patent No.: US 12,390,732 B2
(45) Date of Patent: Aug. 19, 2025

(54) METHOD AND APPARATUS FOR PROVIDING A COMPUTER IMPLEMENTED APPLICATION

(71) Applicant: KING.COM LIMITED, St. Julians (MT)

(72) Inventors: Farshid Hassani Bijarbooneh, Stockholm (SE); Par Johan Eklund, Stockholm (SE); Jacob Alexander Jansson Weinberg, Stockholm (SE)

(73) Assignee: KING.COM LIMITED, St. Julian's (MT)

( * ) Notice: Subject to any disclaimer, the term of this patent is extended or adjusted under 35 U.S.C. 154(b) by 262 days.

(21) Appl. No.: 17/686,731

(22) Filed: Mar. 4, 2022

(65) Prior Publication Data
US 2023/0277933 A1 Sep. 7, 2023

(51) Int. Cl.
*A63F 13/00* (2014.01)
*A63F 13/35* (2014.01)
*A63F 13/537* (2014.01)

(52) U.S. Cl.
CPC ............ *A63F 13/537* (2014.09); *A63F 13/35* (2014.09)

(58) Field of Classification Search
CPC ...... A63F 13/355; A63F 13/30; A63F 13/335; A63F 13/35; A63F 13/77; A63F 13/352; A63F 13/45; A63F 13/00
See application file for complete search history.

(56) References Cited

U.S. PATENT DOCUMENTS

| | | | |
|---|---|---|---|
| 2013/0252725 A1* | 9/2013 | Buhr | A63F 13/45 463/29 |
| 2014/0179427 A1* | 6/2014 | Miura | A63F 13/69 463/31 |
| 2018/0280802 A1* | 10/2018 | Stroud | A63F 13/67 |

* cited by examiner

*Primary Examiner* — David L Lewis
*Assistant Examiner* — Eric M Thomas
(74) *Attorney, Agent, or Firm* — Holzer Patel Drennan (57) ABSTRACT

A client device provides a computer implemented game. When there is a change in the state of the game, the updated state is applied to the game being played on the client device. The client device sends a request associated with the change in state to the server. The changes in state are verified by a response received from the server to the request.

17 Claims, 9 Drawing Sheets

METHOD AND APPARATUS FOR PROVIDING A COMPUTER IMPLEMENTED APPLICATION

FIELD OF THE INVENTION

The embodiments may have particular, but not exclusive application in the field of computer implemented applications including for example games and computing devices therefor.

Embodiments of this application relate to a user device and a server for use in running a computer implemented application, for example a computer implemented game.

Some embodiments may relate to synchronising of a computer implemented application between the user device and the server.

BACKGROUND OF THE INVENTION

In the field of computer-implemented games, there are many technical challenges in synchronising the state of a computer implemented game which is played on a user device with the state stored in a server.

SUMMARY OF THE INVENTION

According to an aspect, there is provided a client device configured to provide a computer implemented game, the client device comprising a user interface, a display, at least one processor and at least one memory, wherein the client device is configured to: receive user input from a user via the user interface to play the computer implemented game; determine by the at least one processer that there are one or more changes in state of the computer implemented game; in response to determining that there one or more changes in the state of the computer implemented game, applying by the at least one processor the one or more changes in the state of the computer implemented game to provide updated game state and generating a request associated with the one or more changes in the state for sending to a server; and determining by the at least one processor from a response received from the server to the request if the updated game state is verified.

The computer implemented game may implement a remote call procedure with the server for changes in state of the computer implemented game, and the at least one processor may be configured to, in response to determining that there are one or more changes in the state of the computer implemented game, provide a predicted response associated with the request and cause the predicted response to be applied.

The at least one processor may be configured to include a sequence number in the request.

The sequence number may be included in a header of the request.

The client device may be configured to receive an indication from the server when the server determines from a respective sequence number in a respective request that one or more requests have not been received by the server and in response, the at least one processor may be configured to resend one or more requests.

The at least one processor may be configured to generate a plurality of different requests, each request being associated with one or more respective changes in state.

The at least one processor may be configured to cause the plurality of requests to be sent in one or more batches.

The at least one processor may be configured to receive a single response from the server to two or more of the plurality of requests.

The at least one processor may be configured to determine that a response from the server to at least one of said requests has not been received within a given time period and in response to cause one or more of the requests for which a response has not been received to be resent to the server.

The at least one processor may be configured to cause each of the plurality of requests to be persisted until at least a response to the respective request is received.

The at least one memory may be configured to store information about one or more updated game states and information about one or more updated game states which are verified.

The at least one processor may be configured to determine that one or more games states is modified by a difference value.

The at least one processor may be configured to apply the difference value to a current respective game state to provide the respective updated game state.

The request associated with the one or more game states modified by a difference value may comprise information about one or more of the difference value for the respective game state and the respective updated game state.

When the client device is offline, the client device may be configured to use the updated game state and when the client device goes back online, the at least one processor may be configured to cause a batch of requests to be sent to the server.

The at least one processor may be configured in response to receiving a message from the server comprising a set of verified game state, change the game state on the client server to that of the set of verified state.

The client device may be configured to operate in a further mode in which a request associated with the one or more changes in state is not sent to the server and the applied game state is accepted as verified without requiring a response from the server.

In response to receiving a message from the server, the at least one processor may be configured to change one or more of the updated game states.

According to another aspect, there is provided a computer implemented method provided by a client device, the method comprising: receiving user input from a user via a user interface of the client device to play a computer implemented game; determining by at least one processer of the client device that there are one or more changes in state of the computer implemented game; in response to determining that there one or more changes in the state of the computer implemented game, applying by the at least one processor the one or more changes in the state of the computer implemented game to provide updated game state and generating a request associated with the one or more changes in the state for sending to a server; and determining by the at least one processor from a response received from the server to the request if the updated game state is verified.

The computer implemented game may implement a remote call procedure with the server for changes in state of the computer implemented game, and the method may comprise in response to determining that there are one or more changes in the state of the computer implemented game, providing a predicted response associated with the request and cause the predicted response to be applied.

The method may comprise including a sequence number in the request.

The sequence number may be included in a header of the request.

The method may comprise receiving an indication from the server when the server determines from a respective sequence number in a respective request that one or more requests have not been received by the server and in response, resending one or more requests.

The method may comprise generating a plurality of different requests, each request being associated with one or more respective changes in state.

The method may comprise causing the plurality of requests to be sent in one or more batches.

The method may comprise receiving a single response from the server to two or more of the plurality of requests.

The method may comprise determining that a response from the server to at least one of said requests has not been received within a given time period and in response causing one or more of the requests for which a response has not been received to be resent to the server.

The method may comprise causing each of the plurality of requests to be persisted until at least a response to the respective request is received.

The method may comprise storing information about one or more updated game states and information about one or more updated game states are verified.

The method may comprise determining that one or more games states is modified by a difference value.

The method may comprise applying the difference value to a current respective game state to provide the respective updated game state.

The request associated with the one or more game states modified by a difference value may comprise information about one or more of the difference value for the respective game state and the respective updated game.

When the client device is offline, the method may comprise using the updated game state and when the client device goes back online, causing a batch of requests to be sent to the server.

The method may comprise in response to receiving a message from the server comprising a set of verified game state, changing the game state on the client server to that of the set of verified state.

The method may comprise operating by the client device in a further mode in which a request associated with the one or more changes in state is not sent to the server and the applied game state is accepted as verified without requiring a response from the server.

In response to receiving a message from the server, the method may comprise changing one or more of the updated game states.

According to another aspect, there is provided a server comprising: an interface configured to receive requests from a client device and to transmit responses to respective requests to the client device, the requests being associated with the one or more changes in state of a computer implemented game being played on the client device; at least one processor; and at least one memory, wherein the server is configured to: in response to receiving a first request from the client device via the interface, determine by the at least one processor from a sequence number in the first request that the first request has previously received from the client device; cause by the at least one processor, a first response to be provided to the first request, the first response being a response to the previously received first request; and cause the interface to transmit the first response to the client device.

According to another aspect, there is provided a server comprising: an interface configured to receive requests from a client device and to transmit responses to respective requests to the client device, the requests being associated with the one or more changes in state of a computer implemented game being played on the client device; at least one processor; and at least one memory, wherein the server is configured to: in response to receiving a first request from a first client device via the interface, determine by the at least one processor that one or more of the changes in state in the first request are rejected; cause by the at least one processor a first response to be provided to the first request, the first response comprising a state difference value and a state outcome indicating that the changes in state in the first request are rejected; and cause the interface to transmit the first response to the first client device.

According to another aspect, there is provided a computer implemented method provided by a sever, the method comprising: receiving, via an interface of the server, requests from a client device and transmitting, via the interface, responses to respective requests to the client device, the requests being associated with the one or more changes in state of a computer implemented game being played on the client device; in response to receiving a first request from the client device via the interface, determining, by at least one processor of the server, from a sequence number in the first request that the first request has previously received from the client device; causing by the at least one processor, a first response to be provided to the first request, the first response being a response to the previously received first request; and causing the interface to transmit the first response to the client device.

According to another aspect, there is provided a computer implemented method provided by a sever, the method comprising: receiving, via an interface of the server, requests from a client device and transmitting, via the interface, responses to respective requests to the client device, the requests being associated with the one or more changes in state of a computer implemented game being played on the client device; in response to receiving a first request from a first client device via the interface, determining by at least one processor of the server that one or more of the changes in state in the first request are rejected; causing by the at least one processor a first response to be provided to the first request, the first response comprising a state difference value and a state outcome indicating that the changes in state in the first request are rejected; and causing the interface to transmit the first response to the first client device.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which.

DETAILED DESCRIPTION OF SOME EMBODIMENTS

The terms user and player are used interchangeably throughout this document and no specific meaning is intended using one or the other unless the context suggests otherwise. Likewise user device and client device are used interchangeably throughout this document and no specific meaning is intended using one or the other unless the context suggests otherwise.

In the following description of various implementations of the invention, reference is made to the accompanying drawings which form a part thereof, and in which are shown by way of illustration various implementations in which the invention may be utilized. It is to be understood that other implementations may be utilized, and structural and functional modifications may be made without departing from the scope of the present invention.

A person skilled in the art will realise that what is described herein are certain example embodiments. It is possible to implement embodiments in a number of variations.

Figure 1:
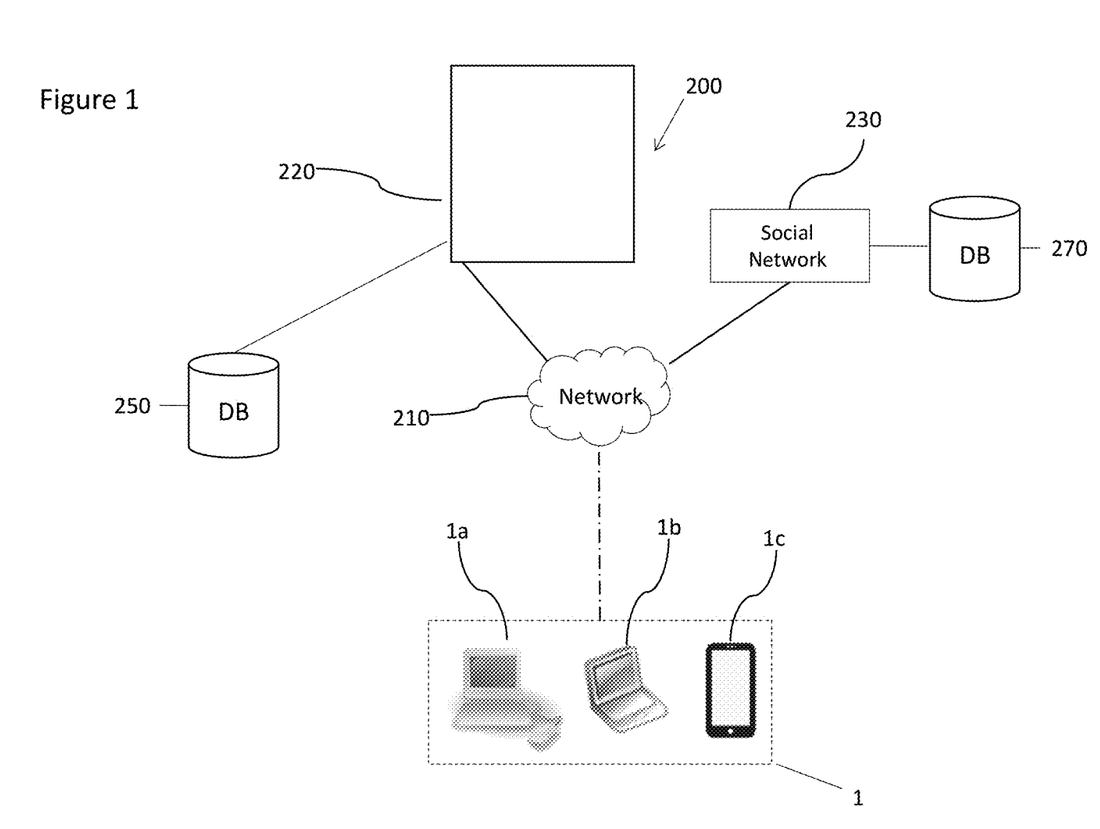
FIG. 1 shows an example system in which some embodiments may be provided.

FIG. 1 schematically shows a system 200 according to an embodiment. The system 200 comprises a server 220 which may store or be in communication with database 250 which may, in some embodiments, store game player's details, profiles, statistics etc. In practice, one or more databases 250 may be provided. In practice, one or more servers 220 may be provided. Where one or more server is provided, the database(s) 250 may be provided in one database 250 across two or more servers.

The server 220 may communicate via, for instance, the internet 210 to one or more client or user devices 1, shown in FIG. 1 by way of example as user devices 1a, 1b and 1c. The server 220 may have connections to a social network 230, for example, Facebook™. The connections may be via the network or via a direct connection. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of part of the database 270 being made on the user device 1.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. Game state may need to be provided to the server. This will be described in more detail later.

The game may be played in an offline mode on the user device using locally stored information on the user device on a temporary basis.

Figure 2:
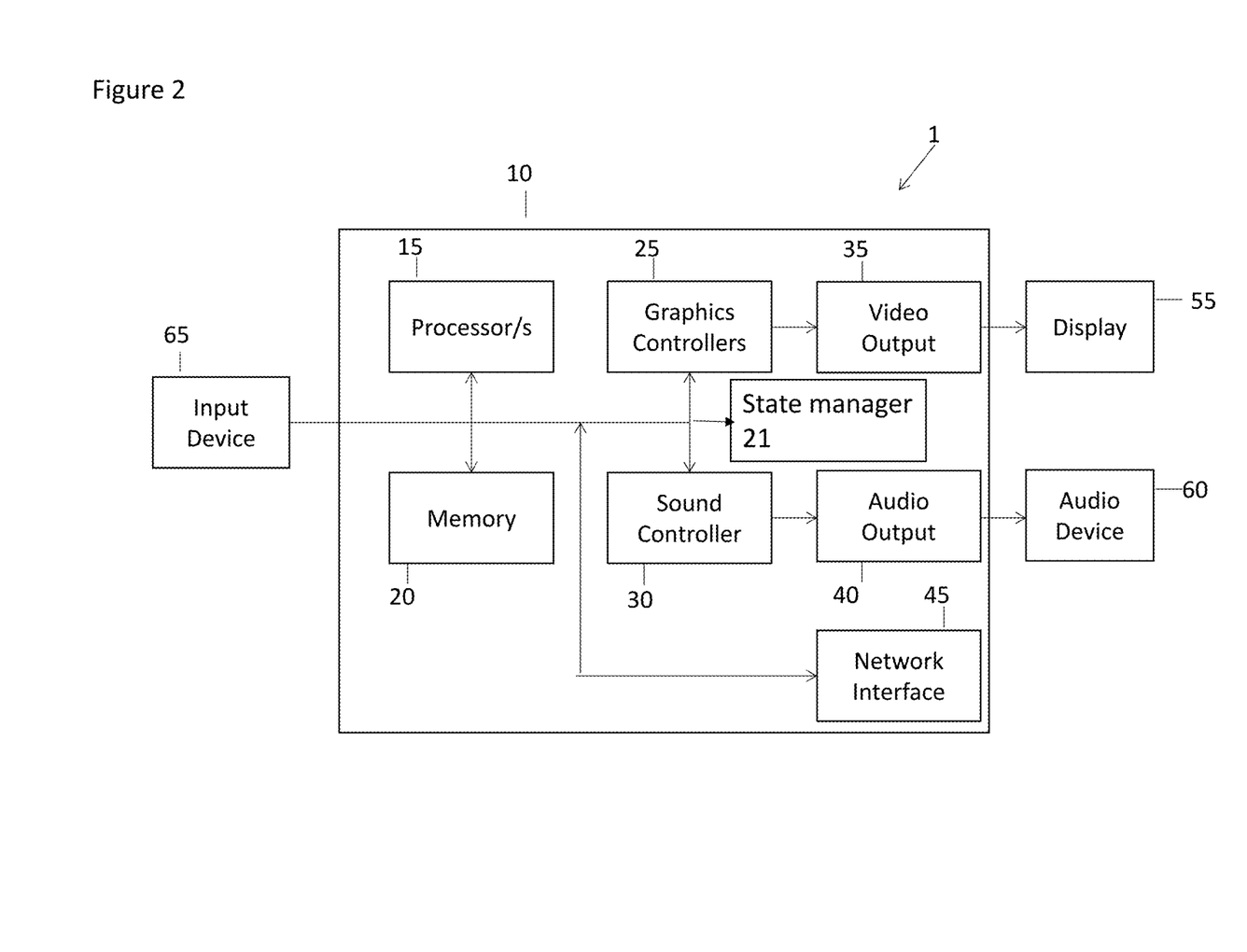
FIG. 2 shows an example user device in which some embodiments may be provided.

A schematic view of a user or client device 1 which may be configured to provide one or more embodiments is shown in FIG. 2. The user device may be configured to provide a computer implemented game. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may comprise one or more processors and/or be provided by the one or more processors 15. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

The control part 10 has an interface 45 allowing the device to be able to communicate with a network such as the Internet or other communication infrastructure.

The device 1 has an input device or user interface 65. The input device can take any suitable format and can be one or more of a keyboard, mouse, touch screen, joystick, or game controller. It should be appreciated that the display 55 may in some embodiments also provide the input device 65 by way of an integrated touch screen for example.

The user device comprises a state manager 21 which will be described in more detail later. It should be appreciated that state manager 21 may comprise one or more processor and/or be provided by the one or more processors 15. The state manager may comprise memory and/or may operate in conjunction with the one or more memories 20. Game state is used to define the current game such as the progress the player has made and/or the part of the game being currently played and/or the current inventory of game items of the player.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

The user device may be a so-called smart phone or tablet. In some embodiments, the user device may be relatively small with a relatively small touch screen or display. The user device may be a lap top computer or a desktop computer or the like.

Some embodiments provide a computer device which is configured to provide a computer implemented game. The computer game may any suitable type. By way of example only some embodiments will be described with reference to a runner type game. Runner games are games where a player has control over a character that is constantly moving. Often the character or game entity will run or move along a path.

Some embodiments provide a resource management computer implemented game. A resource management game generally allows a player to obtain resources. The player will generally then be able to turn these resources into "higher level" products or resources. In resource management games, there may be a delay in providing of one or more of the resources and/or the turning of the resources into other resources. That delay may be controlled by a timer. A player may be able to speed up the timer in some embodiments.

In some embodiments, the resource management part of the computer implemented game may be a base. However, it should be appreciated that in other embodiments, the resource management part of the game may be provided by any other suitable game area.

Some embodiments provide a game which provides a runner game part to collect resources which can be used in a resource management game part. The resource management game part may turn those resources into items which can be used in the runner game part.

Figure 3:
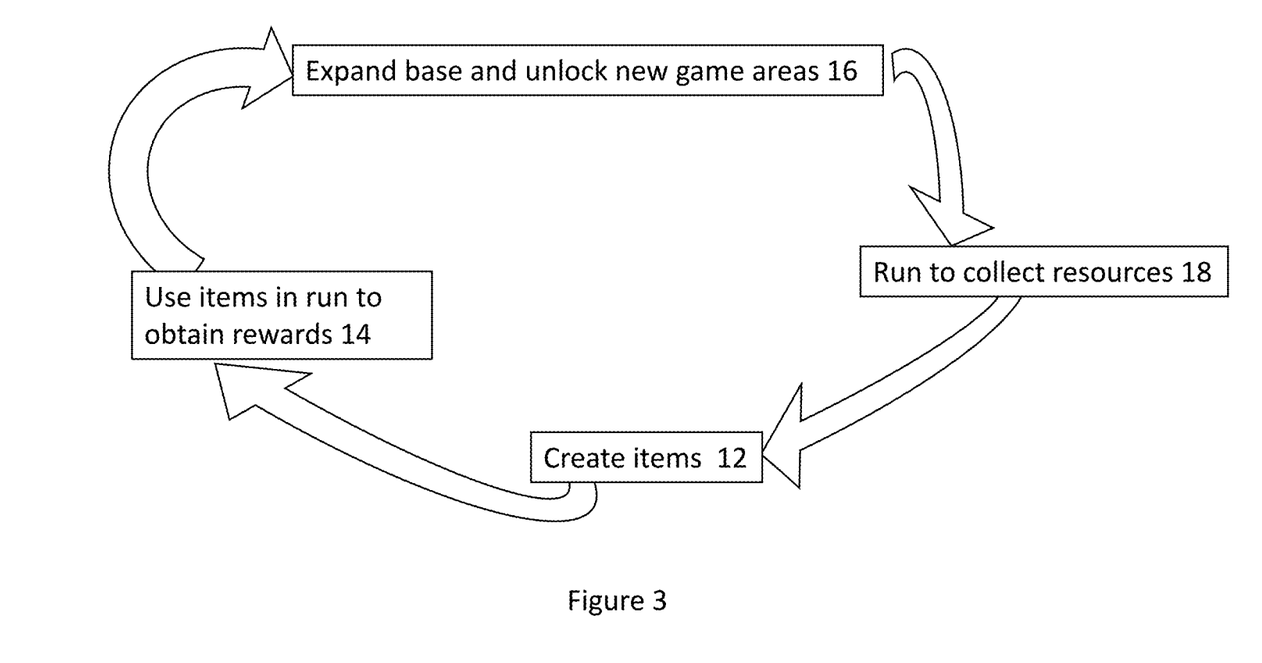
FIG. 3 shows a view of the functional components of an example game.

Reference is made to FIG. 3 which shows schematically an example computer implemented game with which embodiments may be used. FIG. 3 schematically shows the different parts of the example computer implemented game. The computer implemented game may have only one or more than one game area. The different game areas may be represented as different geographical areas or worlds. The different game areas may represent different parts of the game. Different game areas may provide different resource collection runs.

In some embodiments, the at least on processor of the user device may be configured to allow a user to control a character displayed on the display via the user interface. The character may be controlled by the at least one processor in response to user input received via the user interface to perform a collection run. As the character moves through the run, the player is able to provide user input via the user interface which is used by the at least one processor to control the character to collect resources. This is referenced 18 in FIG. 3.

The at least one processor is configured to allow the player to use the collected resources.

In some embodiments, a base is provided. The collection run may be such that the at least one processor causes the user to be automatically taken to the base at the end of a collection run. This may be the case for example where the at least one processor determines that the user has successfully completed a given collection run and has navigated to the end point of the collection run. It should be appreciated that there may be one or more alternative or additional ways of navigating between the collection run and the base.

The at least one processor may be configured to cause one or more base entities to use one or more of the resources to create one or more items. This is referenced 12 in FIG. 3. One or more base entities may be configured by the at least one processor to create one or more further items using one or more items, optionally also with one or more resources.

In some embodiments, the resources may be used to make items such as weapons and/or ammunition for weapons. However, this is by way of example only and in other embodiments, the resources may be used to make alternative or additional items.

The at least one processor may be configured to cause resources which are collected to be processed to provide items which can be used in battles against an enemy. The at least one processor may be configured to cause items to be created from the one or more resources in a base entity such as a lab.

Thus, in some embodiments, resources are collected in response to user input received via the user interface to control a character in a collection run or otherwise collected. In some embodiments, the at least one processor may be configured to use resources to create an item.

In some embodiments, the items may be used in one or more battle runs to obtain rewards. This is referenced 14 in the embodiment of FIG. 3. A battle run is associated with an enemy. This may be different to the collection runs discussed in relation to reference 18. For example, a battle run may be associated with a specific enemy which can be defeated with an item such as a weapon and/or ammunition which have been made from the collected resources. In some embodiments, there may be a specific item such as a weapon and/or ammunition required to defeat a specific enemy.

If the player defeats the enemy, the player may earn one or more rewards. In some embodiments, a victory against the enemy will provide one or more power gem resources.

In some embodiments, in order to upgrade, make or unlock one more base entities, the at least one processor may require one or more rewards acquired as a result of defeating one or more enemies. The rewards and/or one or more items and/or one or more resources may be used to modify a base and/or unlock new game areas. This is referenced 16 in FIG. 3.

It should be appreciated that the computer implemented game described in relation to FIG. 3 is only one example of a computer implemented game with which embodiments may be used.

In a computer implemented game, there many examples of client device/server communications. By way of example only, these may comprise one or more of: logins; tracking; purchases; crash reports; and game specific backend API (application programming interface) calls.

Some games use JSON-RPC (JavaScript Object Notation remote procedure call protocol). This is a stateless RPC. JSON-RPC allows for notifications (data sent to the server that does not require a response) and for multiple calls to be sent to the server which may be answered asynchronously. Other embodiments may use any other suitable protocol.

A remote procedure call is a communication technique that is used for client-server based applications. A client has a request message that the RPC translates and sends to the server. However, there may be one or more issues when using a protocol such as JSON-RPC. One issue may relate to latency resulting from the communication between the client device and the server. When the server receives the request, it sends the required response back to the client. The client is blocked while the server is processing the call and only resumed execution after the server is finished.

Another issue may occur when there is a connection interruption or the client device needs to go offline temporarily. The computer implemented game may be unable to proceed until the response is received from the server.

Another issue relating to a connection interruption or the client device needing to go offline temporarily is persistence.

Requests which are sent before the connection is interrupted or the device goes offline but for which a response is still outstanding may be lost. This means that a reward which is earned by the player on the computer device might be lost which is undesirable.

Figure 4:
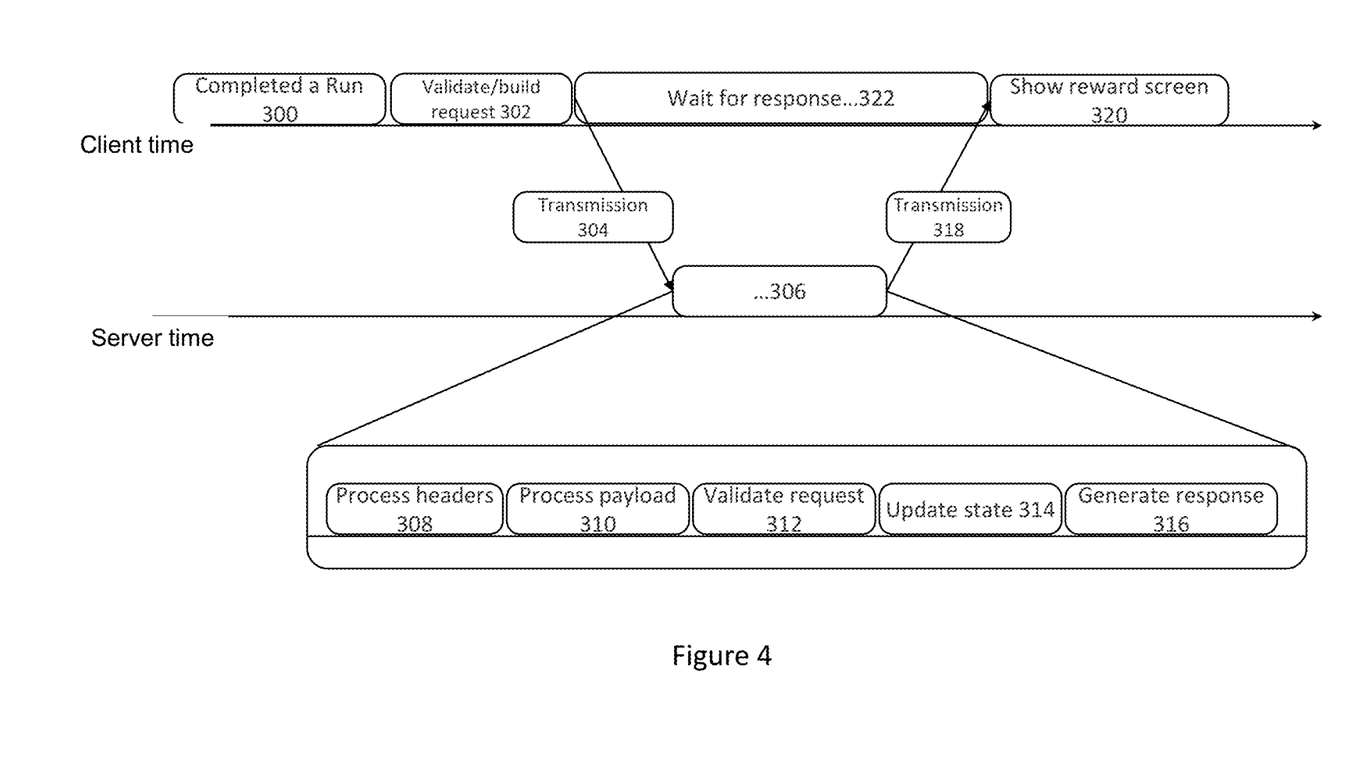
FIG. 4 shows one example for synchronising state between a user device and a server.

In this regard, reference is made to FIG. 4 which shows synchronisation between a client on a user device and a server using a protocol such as JSON.

On the client device, a run 300 is completed. This causes a corresponding request 302 to be generated and transmitted, as referenced 304, to the server. The server will process the received request as generally referenced 306. The processing by the server may require the processing of headers 308, the processing of the payload of the request 310, the validating of the request 312, the updating of state 314, and the generating of a response 316. The server transmits the response to the client device as referenced 318.

In response to receiving the response from the server, a reward screen is displayed on the client device as referenced 320. As referenced 322, there is a delay between the request being transmitted to the server and the response being received from the server which leads to latency. This may be undesirable in some scenarios. In this scenario, the client is blocked until the response to the request is received.

Some embodiments may provide a finite state machine in the client device which predicts the server response or generates a prediction. This is part of the state manager referenced 21 in FIG. 2. A predicted response or prediction is generated in the client device and immediately used by the client device as a response. Where JSON-RPC is used, a predicted response may be JSON-RPC response. The handling of the actual requests is done in the background by the server.

The requests may be encapsulated in operations. Operations may be asynchronous (non-blocking) or synchronous (blocking). The operations may be queued and persisted on the client device.

In some embodiments, the operations are processed in order when a connection becomes available.

Embodiments allow the client state to be corrected where the actual server response did not match the predicted outcome.

Figure 5:
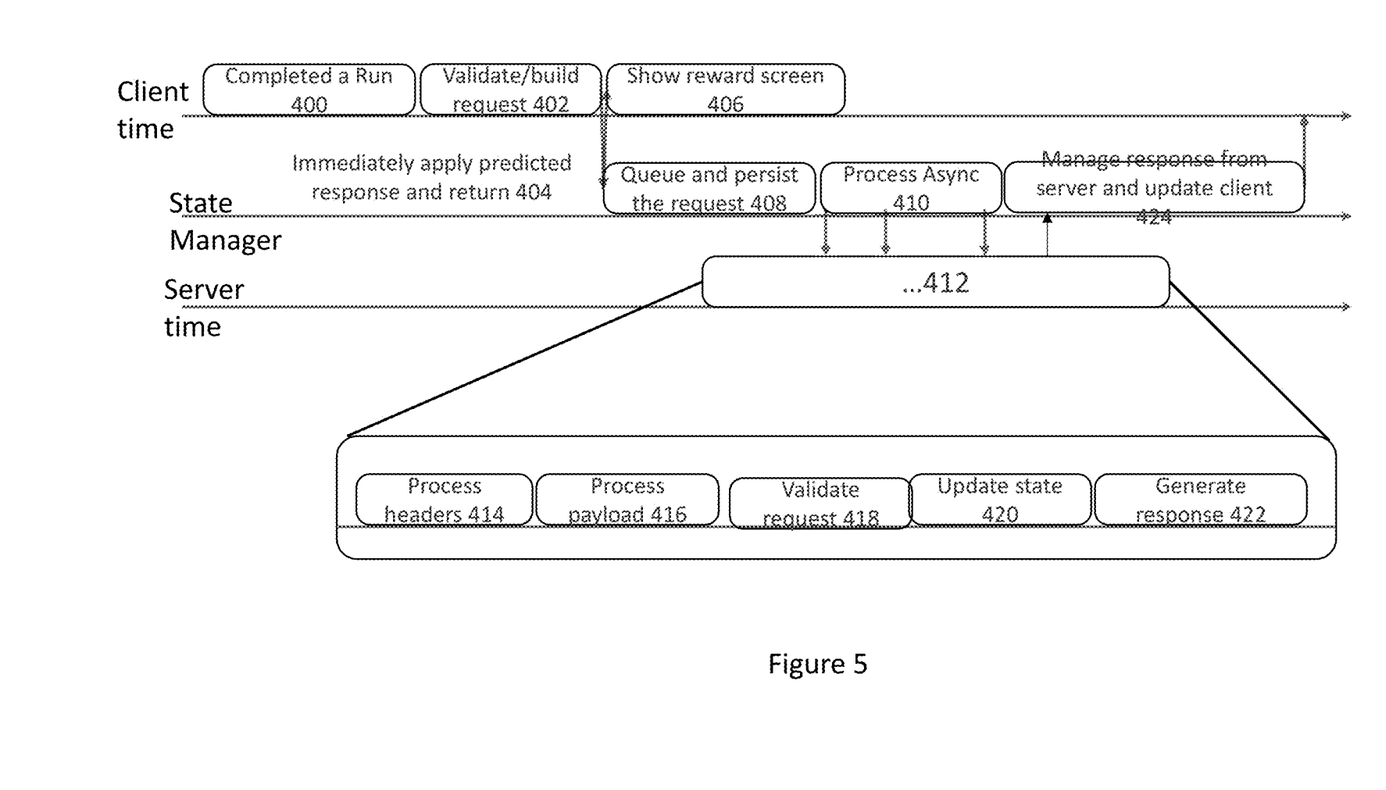
FIG. 5 shows another example for synchronising state between a user device and a server according to some embodiments.

In this regard, reference is made to FIG. 5 which shows synchronisation between a client device and a server using a protocol such as JSON with a finite state machine in the client device providing predicted responses.

On the client device, a run 400 is completed. This causes a corresponding request 402 to be generated. The state manager on the client device is configured, in response to the request, to immediately apply a predicted response and return that predicted response as referenced 404. In response to receiving the predicted response, a reward screen is displayed on the client device as referenced 406. As can be seen there is little or no latency between the request being generated and the predicted response being provided by the state manager.

The state manager will queue and persist the request as referenced 408. The state manager can asynchronously process the queued requests, sending them to the sever, as referenced 410. It should be appreciated that the requests can be sent in one or more batches and/or individually.

The state manager may generate a sequence number that is added to the header and is used by the server to avoid processing a retried request more than once. If a request is retried and server detects it using the sequence number then it would return the response to the client without processing the request for the second time. The header may be a JSON-RPC header. This ensures that in cases where the client misses the response from the server (due to connection interruptions) then the server and client remain in synchronisation.

The server will process the received request as generally referenced 412. The processing by the server may require the processing of headers 414, the processing of the payload of the request 416, the validating of the request 418, the updating of state 420 and the generating of a response 422. The server transmits the response to the client device.

In response to receiving the response, the state manager will manage the response and update the client, as referenced 424. This may be to confirm the predicted response.

In some embodiments, the state manager may instead of providing a predicted response, just generate a prediction. The prediction may be is in the form of partial state (state diffs) and the partial state can be applied to the current player state. Once applied the resulting state is expected to be the same as the state after the server processes the request from the client device.

In some embodiments, the state manager may instead of providing a predicted response, just applies an updated state. A change in state is determined (this may be by the state manager or another game managing function) and applied.

States are data structures maintaining the data for the player's current state. In one example of a computer implemented game, a state maintains the following high level data:

Inventory: a collection of item types and their amounts. E.g., Purple Crystal: 100

Progress: this may be one or more data structures representing the progress of the player. E.g., Character Progress (character id, skin id)

Game State: game specific state that is not covered by progress or inventory. E.g., cooldowns (cooldown id, cooldown seconds, client time started)

This is by way of example only and the state which is maintained will depend on the computer implemented game.

The state manager of the client device may create a predicted state and submit it with an operation reference as a transition to the player state. By way of example only, the predicted state may include one or more the following:

1. Create an inventory data transfer object from the game state. This can be a partial state with just the difference or the full state value.
2. Create a progress data transfer object from the game state.

The client may registers a call back on the player state manager for when the response is received from the server. The call back may perform one or more of the following:

1. Checks the outcome and if rejected it reverts the state back to the last confirmed state.
2. Send an event for the operation, for example using a main thread dispatcher. This allows all listeners to the event to update their internal values etc. For example, this allows the user interface to show updated values associated with the states.

The call back may be wrapped inside a coroutine and once triggered it may be executed on the main thread.

In some embodiments, the state manager maintains two copies of state:

predicted state: a predicted state represents the client state while the requests are not yet processed by the server and client relies on the predicted response. The predicted state may be regarded as state which is not yet verified by the server.

verified state: represents the state that is fully synchronised with server. Verified state holds the changes for the requests that have actually received a response from server.

In embodiments, the predicted states and the verified state may converge.

In some embodiments, the state may be modified by a difference value. For example, an inventory may be modified by adding a difference value for an item type. The difference value may be a positive or negative value. For example, the player may have a current inventory value of 100 for a given item. The player may acquire two more of the given item. In some embodiments, the request sent to the server may include the value by which the state is to be modified, that is 2 in this example.

In some embodiments, where the state is modified, the request, which is sent to the server, may alternatively or additionally include the updated value of the state.

In some embodiments, the update of one or more states may be conveyed to server by the updated value of the state and the update of one or more other states may be conveyed to the server by a difference value.

In some embodiments, all operations for which a request is required to be sent to the server may be persisted in the memory of the client device in a thread safe manner. The memory on the client device may have a persisted binary file which is updated every time a new operation is performed. In some embodiments, together with an operation one of more of the following may also be persisted: the name and/or reference of the operation (string type); predicted state at the time of making the request; and contextual properties, such as request headers. The contextual properties may include version information such as configuration version, catalog version and/or the like.

In some embodiments, the actual JSON-RPC or the like request is not persisted. In this case, the request parameters are persisted and the JSON-RPC call is reconstructed if the request needs to be resent If there is no reply to a request, the request is retried. This may be controlled by a timer. For example, if a response is not received within a given time, the request is retried, that is resent to the server.

A queue observer is used to monitor the status of the queue in case of connection issues.

In some embodiments, the client device is not penalised for the loss of connection as long as the current play mode does not require an online mode (for example in the case of social interactions). Some embodiments thus use a hybrid authoritative approach where the client can fully predict the game state and the server asynchronously validates the requests from the client and synchronises when the client device comes online.

The state manager enforces that all operations are served in a first in, first out manner. An operation will have to receive a response before the next operation can run. This can be the predicted response. The client is not slowed down because most operations are performed asynchronously.

If a response is not received from the server, the client device resends the request. Consider the scenario where the server already processed the operation but client lost or did not receive the response. Each operation is provided with a unique request identity. The server maintains the last processed sequence identity and if the request is already processed then the server responds with an early response. Thus the server uses the request identity to determine if it has already processed the request.

Synchronous operations are processed only after all asynchronous operations in the queue are processed. Processing of asynchronous operations is suspended until a response for an asynchronous operation is received (or an error is raised)

The state manager is initialized with a synchronization operation once the player is logged into the game. At any time, there may be at most only one synchronization operation in the queue. A synchronization operation delivers the entire verified state from client to the server.

If the verified state on the client differs from that stored in the server then the verified state on client device may be reset to the server state. The predicted state is recalculated by applying the pending operations in the queue on top of the new verified state. The verified state is persisted in the client device. The client may trigger a flow which informs the player with a popup that something went wrong.

In some embodiments, the state manager can mock the server responses. This means that the state manager will simply accept the predicted response as the server responses. This makes it possible to run the game entirely offline where the gameplay allows it (e.g., no social interaction needed) or in a testing scenario, The server may compute the state and compares it against predicted state of the client device:

If the two match, then server responds with an indication that the request is accepted in the response sent to the client device.

If the two do not match, then server responds with a response that includes the entire verified state on server. In some embodiments, the responses from the server are wrapped by the server to ensure that the responses fit that the generic response form supported by the state manager. In some embodiments, the generic response may include a state difference value (partial state) and a state outcome (which indicates if the state in the request is accepted or rejected). The client device then restores its state to the verified state returned by server. The state difference value may indicate that change which is to be applied to the predicted state in order to bring it in line with the state held by the server.

In some embodiments, the server and/or client device may attempt to determine a reason for there being a difference between the predicted state and the state on the server. The client device may provide display information about the reason for there being a difference between the predicted state and the state on the server. An example of this is when a compensation is made to the player and delivered to the server. Compensation could for example be deliver 100 purple crystals to the player. Using the sync operation the server detects that the client did not receive the compensation yet and then synchronize the state. This updates the client and informs the player that a compensation was made for their account.

If server detects that the request is malformed or is a cheat the server responds with a rejection of the client request. That will reset the operations queue in the client device. This may also trigger the display of a disturbance popup to the player.

In some embodiments, the server may switch to accept the client's predicted state even where it not the same as the server state. In that case, the server will update its verified state to that of the client's state. This makes it possible to switch between client authoritative and server authoritative models. The switch is on the server and can be made per API endpoint.

Thus asynchronous operations do not have a call back for success or failure. The result of making an asynchronous operation is immediately predicted and applied to the player's predicted state.

A rejection from server clears the operations queue in the client device.

In some embodiments, there may be a limit in size to the operations queue in the state manager. In this case, once the limit is reached, the player may be unable to continue to play the game until the queue is reduced. This may require an offline player to go online to continue to play the game.

Figure 6:
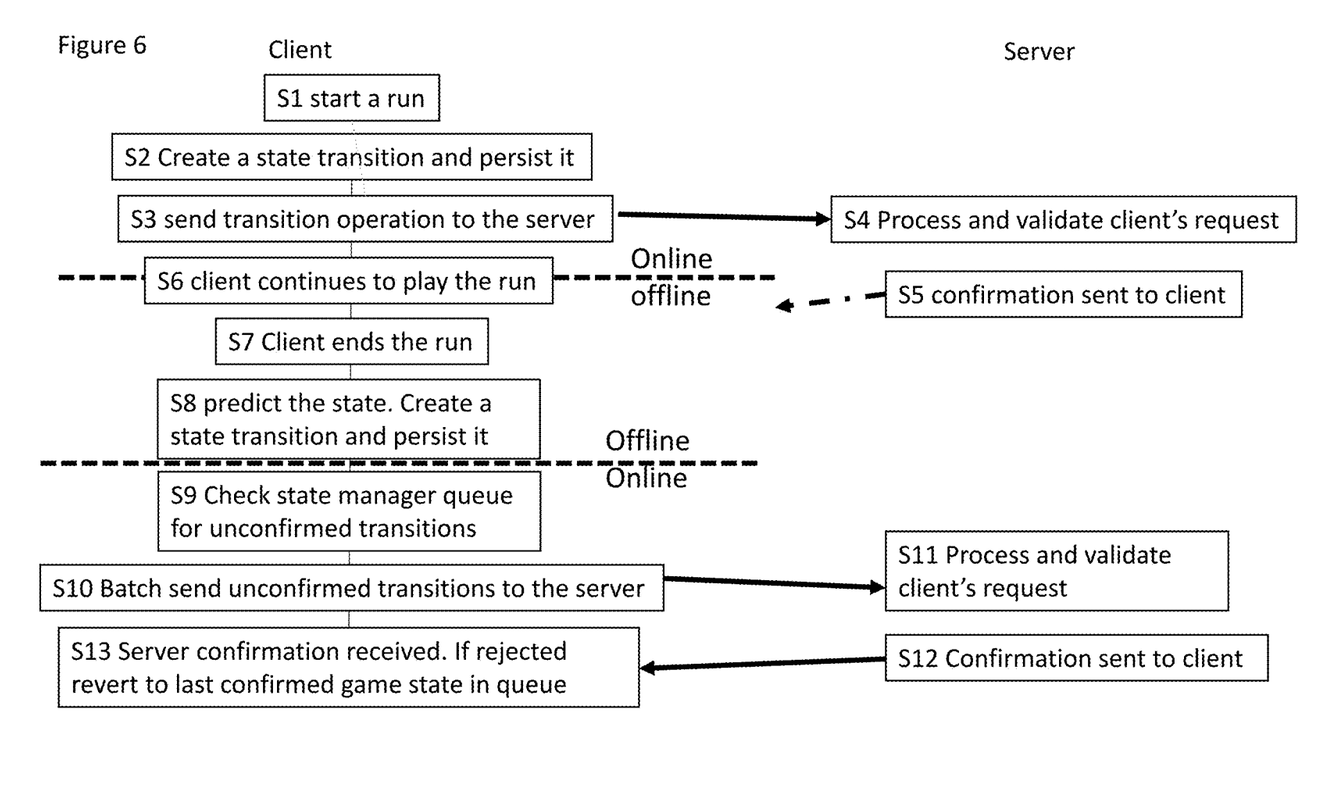
FIG. 6 shows another example for synchronising state between a user device and a server according to some embodiments where the user device goes offline for a period of time.

Reference is made to FIG. 6 which shows a method flow where the user device goes offline.

The client actions are on the left of FIG. 6 and the server actions on the right.

In S1, on the client device, the client device is online and a run is started.

In S2, on the client device, the client device is online and a state transition is created and persisted. The state transition is created as there is a change in state resulting from the run being started.

In S3, on the client device, the client device is online and a state transition operation is sent to the server. A request is thus sent to the server which indicates the change in state. A predicted response is also applied in the client device as discussed previously. The predicted game state is added to a queue to be persisted until it is processed and the outcome is received from the server.

In S4, on the server, the client request is processed and validated.

In S5, the server attempts to send a response to the client device confirming the predicted state.

In parallel with S4 and S5, the player continues to play the game on the client device as referenced S6. While the player is playing the game, the client device goes offline. This means that the response sent by the server in S5 is not received by the client device.

In S7, on the client device, the client device is offline and the run is ended.

In S8, on the client device, the client device is offline and a state transition is created and persisted. The state transition is created as there is a change in state resulting from the run being ended. In the example of FIG. 5, there may or may not be a plurality of state transitions between the state transition of S3 and the state transition of S8.

In S9, on the client device, the client device is back online and the state manager queue is checked for any unconfirmed transactions, that is transactions or requests for which a response has not been received from the server.

In S10, on the client device, the client device is online and sends the unconfirmed transactions to the server. These may be sent individually or in one or more batches.

In S11, on the server, the requests are processed and validated.

In S12, on the server, the responses are sent to the clients. The responses may be sent individually or in one or more batches. In some embodiments, the server may simply confirm the latest received request (which has an identifier) and this indicates to the client device that the requests preceding the latest received request are also validated.

In S13, on the client device, the client device is online and the server confirmation is received. If the server rejects the predicted state, the state manager may revert to the last confirmed or verified game state in the queue.

Figure 7:
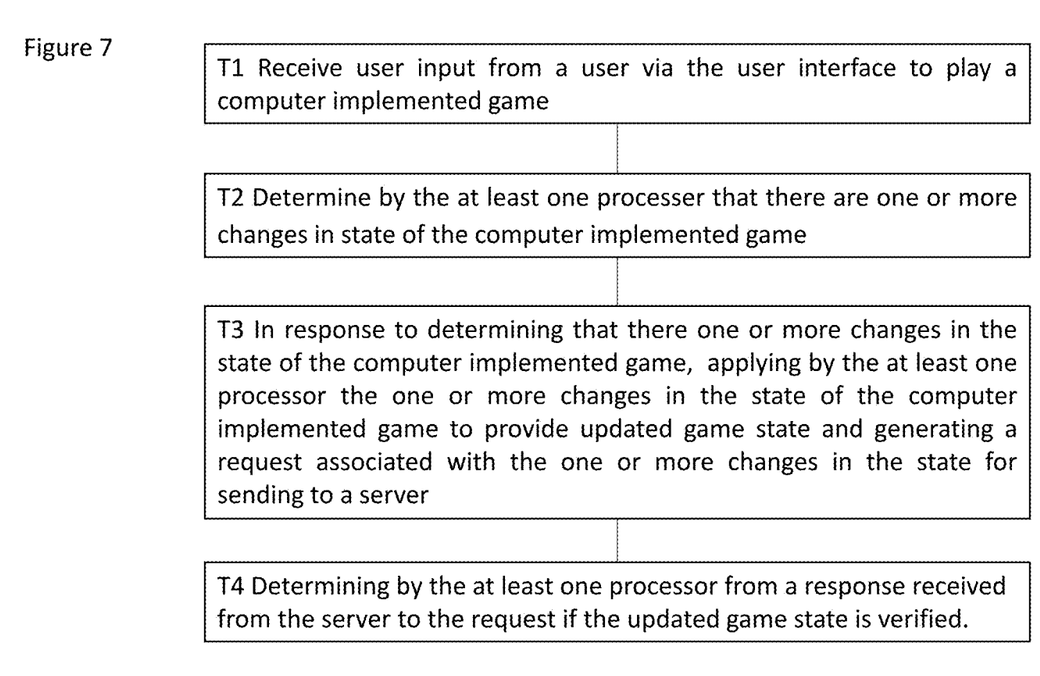
FIG. 7 schematically shows a first method provided in a user or client device of some embodiments.

Reference is made to FIG. 7 which shows a computer implemented method of some embodiments. The method is provided by a client device.

The method comprises in step T1 receiving user input from a user via a user interface of the client device to play a computer implemented game.

The method comprises in step T2 determining by at least one processer of the client device that there are one or more changes in state of the computer implemented game;

The method comprises in step T3 in response to determining that there one or more changes in the state of the computer implemented game, applying by the at least one processor the one or more changes in the state of the computer implemented game to provide updated game state and generating a request associated with the one or more changes in the state for sending to a server.

The method comprises in step T4 determining by the at least one processor from a response received from the server to the request if the updated game state is verified.

Figure 8:
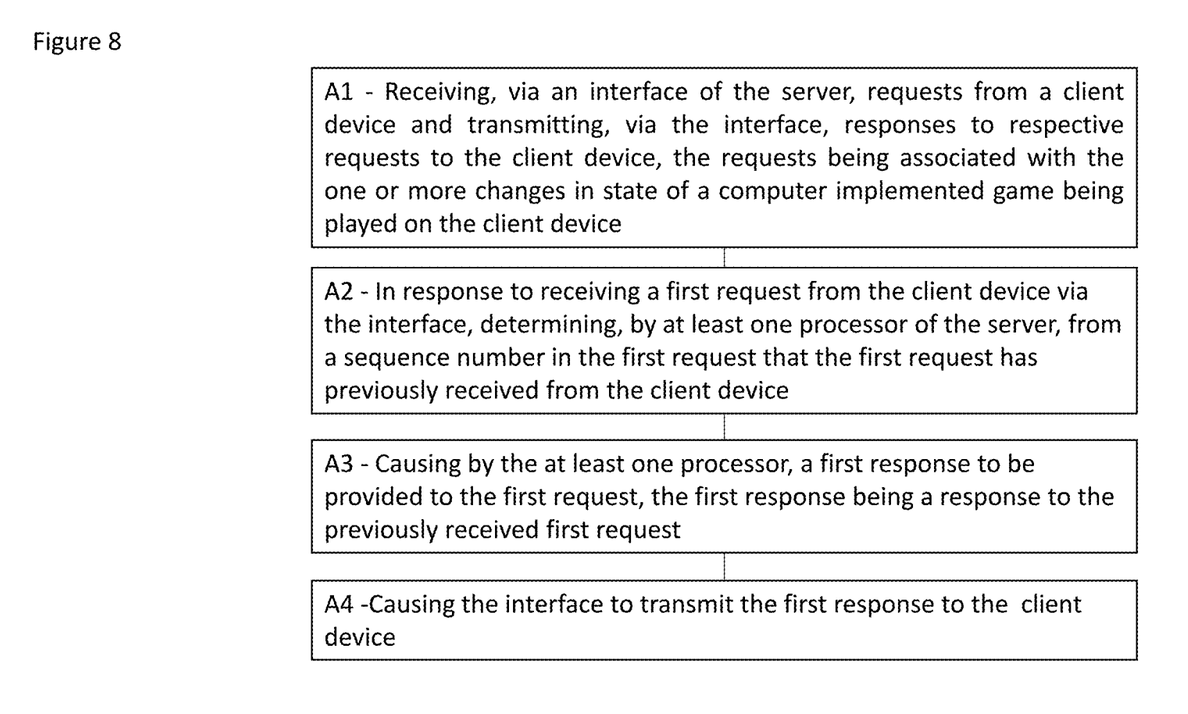
FIG. 8 schematically shows a second method provided in a server of some embodiments.

Reference is made to FIG. 8 which shows a computer implemented method of some embodiments. The method is provided by a server.

The method comprises in step A1 receiving, via an interface of the server, requests from a client device and transmitting, via the interface, responses to respective requests to the client device, the requests being associated with the one or more changes in state of a computer implemented game being played on the client device.

The method comprises in step A2 in response to receiving a first request from the client device via the interface, determining, by at least one processor of the server, from a sequence number in the first request that the first request has previously received from the client device.

The method comprises in step A3 causing by the at least one processor, a first response to be provided to the first request, the first response being a response to the previously received first request.

The method comprises in step A4 causing the interface to transmit the first response to the client device.

Figure 9:
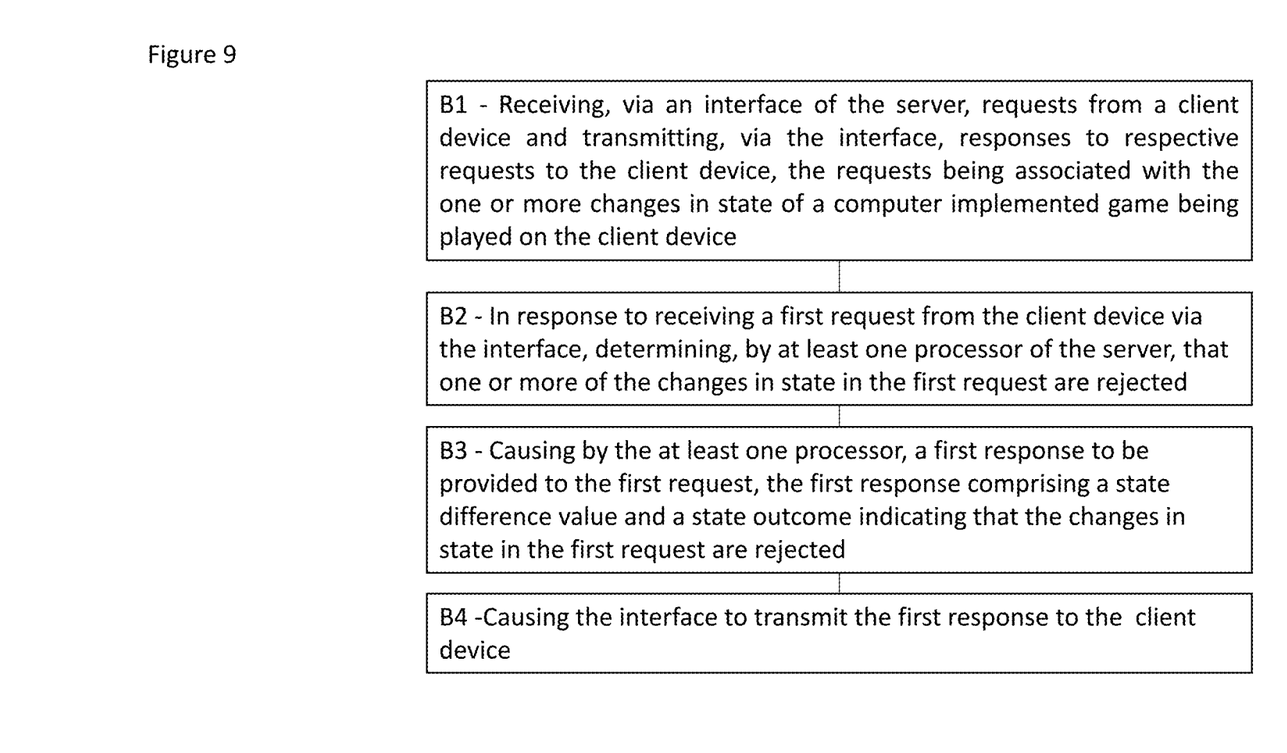
FIG. 9 schematically shows a third method provided in a server of some embodiments.

Reference is made to FIG. 9 which shows a computer implemented method of some embodiments. The method is provided by a server.

The method comprises in step B1 receiving, via an interface of the server, requests from a client device and transmitting, via the interface, responses to respective requests to the client device, the requests being associated with the one or more changes in state of a computer implemented game being played on the client device.

The method comprises in step B2, in response to receiving a first request from a first client device via the interface, determining by at least one processor of the server that one or more of the changes in state in the first request are rejected.

The method comprises in step B3 causing by the at least one processor a first response to be provided to the first request, the first response comprising a state difference value and a state outcome indicating that the changes in state in the first request are rejected.

The method comprises in step B4, causing the interface to transmit the first response to the first client device.

In the above described embodiments, reference has been made to a computer implemented game. It should be appreciated that this is by way of example only. In other embodiments, any other suitable computer application running on a client device and having communication with the server. The computer application running on the client device may require synchronisation with the server.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided, and embodied by means of an appropriate carrier medium. An appropriate computer program can be embodied on a computer readable record medium. A possibility is to download the program code product via a data network. In general, the various embodiments may be implemented in hardware or special purpose circuits, software, logic, or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A client device configured to provide a computer implemented game, the client device comprising a user interface, a display, at least one processor and at least one memory, wherein the client device is configured to:
   receive user input from a user via the user interface to play the computer implemented game;
   determine by the at least one processor that there are one or more changes in state of the computer implemented game;
   in response to determining that there one or more changes in the state of the computer implemented game, provide a predicted response;
   applying by the at least one processor the predicted response, whereby the one or more changes in the state of the computer implemented game are applied to provide an updated state of the computer implemented game;
   implement a remote call procedure with a server for changes in the state of the computer implemented game, wherein a request is generated and sent to the server, the request associated with the predicted response;
   determine by the at least one processor from a response received from the server to the request if the updated state of the computer implemented game is verified; and
   change the updated state of the computer implemented game, associated with the predicted response, to a verified state of the computer implemented game, when the updated state of the computer implemented game associated with the predicted response is not verified by the server, the verified state of the computer implemented game being received from the server.

2. The client device as claimed in claim 1, wherein the at least one processor is configured to include a sequence number in the request.

3. The client device as claimed in claim 2, wherein the sequence number is included in a header of the request.

4. The client device as claimed in claim 2, wherein the client device is configured to receive an indication from the server when the server determines from a respective sequence number in a respective request that one or more requests have not been received by the server and in response, the at least one processor is configured to resend one or more requests.

5. The client device as claimed in claim 1, wherein the at least one processor is configured to generate a plurality of different requests, each request being associated with one or more respective changes in state of the computer implemented game.

6. The client device as claimed in claim 5, wherein the at least one processor is configured to cause the plurality of different requests to be sent to the server in one or more batches.

7. The client device as claimed in claim 5, wherein the at least one processor is configured to receive a single response from the server to two or more of the plurality of different requests.

8. The client device as claimed in claim 5, wherein the at least one processor is configured to determine that a response from the server to at least one of different requests has not been received within a given time period and in response to cause one or more of the different requests for which a response has not been received to be resent to the server.

9. The client device as claimed in claim 5, wherein the at least one processor is configured to cause each of the plurality of requests to be persisted until at least a response to the respective request is received.

10. The client device as claimed in claim 1, wherein the at least one memory is configured to store information about one or more updated states of the computer implemented game and information about one or more updated states of the computer implemented game which are verified.

11. The client device as claimed in claim 1, wherein the at least one processor is configured to determine that one or more states of the computer implemented game is modified by a difference value.

12. The client device as claimed in claim 11, wherein the at least one processor is configured to apply the difference value to a current respective state of the computer implemented game to provide the respective updated state of the computer implemented game.

13. The client device as claimed in claim 11, wherein the request associated with the one or more states modified by a difference value comprises information about one or more of the difference value for the respective state of the computer implemented game and the respective updated state of the computer implemented game.

14. The client device as claimed in claim 1, wherein when the client device is offline, the client device is configured to use the updated state of the computer implemented game and when the client device goes back online, the at least one processor is configured to cause a batch of requests to be sent to the server.

15. The client device as claimed in claim 1, wherein the client device is configured to operate in a further mode in which a request associated with the one or more changes in the state is not sent to the server and the applied state is accepted as verified without requiring a response from the server.

16. A computer implemented method provided by a client device, the method comprising:
receiving user input from a user via a user interface of the client device to play a computer implemented game;
determining by at least one processor of the client device that there are one or more changes in state of the computer implemented game;
in response to determining that there one or more changes in the state of the computer implemented game, provide a predicted response;
applying by the at least one processor the predicted response, whereby the one or more changes in the state of the computer implemented game are applied to provide an updated state of the computer implemented game;
implementing a remote call procedure with a server for changes in the state of the computer implemented game, wherein a request is generated and sent to the server, the request associated with the predicted response;
determining by the at least one processor from a response received from the server to the request if the updated state of the computer implemented game is verified; and
changing the updated state of the computer implemented game, associated with the predicted response, to a verified state of the computer implemented game, when the updated state of the computer implemented game associated with the predicted response is not verified by the server, the verified state of the computer implemented game being received from the server.

17. A non-transitory computer readable storage device storing instructions that, when executed by at least one processor of a client device causes said at least one processor to perform the following steps:
receive user input from a user via a user interface of the client device to play a computer implemented game;
determine that there are one or more changes in state of the computer implemented game;
in response to determining that there one or more changes in the state of the computer implemented game, provide a predicted response;
apply the predicted response, whereby the one or more changes in the state of the computer implemented game are applied to provide an updated state of the computer implemented game;
implement a remote call procedure with a server for changes in the state of the computer implemented game, wherein a request is generated and sent to the server, the request associated with the predicted response;
determine from a response received from the server to the request if the updated state of the computer implemented game is verified; and
change the updated state of the computer implemented game, associated with the predicted response, to a verified state of the computer implemented game, when the updated state of the computer implemented game associated with the predicted response is not verified by the server, the verified state of the computer implemented game being received from the server.

* * * * *